Patented Oct. 25, 1932

1,884,715

UNITED STATES PATENT OFFICE

THEOPHIL E. JERABEK, OF EAST CLEVELAND, OHIO, ASSIGNOR TO THE LINCOLN ELECTRIC COMPANY, OF CLEVELAND, OHIO, A CORPORATION OF OHIO

WELDING ELECTRODE

No Drawing. Application filed December 19, 1930. Serial No. 503,612.

During the process of electric arc welding and more specifically when metallic weld rods are employed, it is customary, for some classes of work, to provide a flux coating for such weld rods which has ingredients which burn during the welding process to form an inert atmosphere of non-oxidizing gas, which protects the electrode metal from oxidation when it is in the molten state, and further, excludes nitrogen present in the air from such molten metal, preventing the formation of harmful iron nitrides. It is an object of this invention to provide a coating for welding electrodes which shall produce desirable results not achieved by any type or types of coating heretofore employed.

Some of the materials employed for the purpose of accomplishing the above named desirable results have been carbohydrates such as sugar, starch, flour or cellulose. Certain of these materials are employed because of their desirable physical characteristics and properties, although their action as a constituent of a flux coating is not the most desirable and not as satisfactory as that obtainable from the use of other materials having more desirable chemical properties. In the immediate vicinity of the arc the above referred to organic materials burn to form carbon monoxide and water, the carbon monoxide later oxidizing to form carbon dioxide. When cellulose is employed, the chemical reaction which takes place may be expressed by the following equation:

$$C_6H_{10}O_5 + 3O_2 = 6CO + 5H_2O;$$

or, showing the completed reaction, $$C_6H_{10}O_5 + 6O_2 = 6CO_2 + 5H_2O.$$

From the above equation it will be readily apparent that the amount of oxygen taken up from the air during the burning of the cellulose is approximately 59 per cent. of the weight of the organic material consumed. The reaction which occurs when the other named carbohydrates, which are commonly employed as flux coating, are burned in the vicinity of the arc is similar to that just referred to in connection with the employment of cellulose so that a detailed consideration of these reactions is believed to be unnecessary. It is a further object of my invention to provide a flux coating for weld rods which shall be more efficient in its consumption of oxygen from the air and accordingly more efficient in its action to provide a blanket of inert gas around the molten metal to attain the above named desirable results.

My invention then consists of the steps hereinafter fully described and particularly pointed out in the claims; the following description setting forth in detail certain steps embodying the invention, such disclosed steps constituting, however, but one of the various ways in which the principle of the invention may be used.

Specifically my invention consists in providing a coating for weld rods or electrodes, specifically metallic electrodes which shall have all of the necessary physical properties required for such use, and which, in addition, may be employed to great advantage over the class of materials above mentioned because of a more desirable chemical make up.

A material which may be used as a coating for weld rods or electrodes, and which has all of the above-named superior characteristics, is lignin. When a welding electrode which is coated with lignin is fed to the arc, the burning of the lignin may be expressed by the following equation:

$$C_{20}H_{20}O_6 + 22O_2 = 20\ CO_2 + 10\ H_2O.$$

From the above equation it will be noted that during the burning of the lignin, the oxygen taken up from the surrounding air is approximately equal to 99 per cent. of the weight of lignin consumed. By comparing the results achieved by the use of lignin as illustrated by the above equation with the results achieved by the use of carbohydrates as hereinbefore referred to, it will be noted that the lignin is approximately twice as efficient in providing a blanket of inert gas around the molten metal as any material or materials which have heretofore been employed.

The lignin may be secured from the usual sources, such as wood or bark, and inasmuch as the preparation of the lignin, which is well known to those familiar with the art, forms no part of this invention, a further consideration of the method of providing the lignin will not be gone into.

The lignin, and any other materials associated with it which may be found desirable, may be secured to the weld rod or electrode by preparing a suitable plastic mass of such material and then extruding the same onto the weld rod or such coating may be placed thereon in any other well-known fashion. When the lignin is employed for the purposes hereinbefore stated, it will be found advisable to incorporate with such lignin in the coating on the weld rod, a suitable heat-resisting material which will prevent an excessive dissipation of the lignin due to the heat of the arc, so that the actual combustion thereof to form the desired blanket of inert atmosphere over the molten metal will occur in the immediate vicinity of the arc. Some materials which may be employed for this purpose are clay, specifically kaolin, asbestos, or suitable silicates and oxides. The asbestos is desirable to be used as a heat-resisting material due to the fact that the fibrous structure thereof materially assists in securing the lignin and other materials associated therewith on the weld rod. Suitable silicates may be employed as a heat-resisting material such as sodium silicate, although it will be found that the primary function of such silicates, specifically sodium silicate will be to provide a binder for the lignin and the other ingredients to properly secure the same to the rod.

In addition to the above named materials which may be incorporated with the lignin in the flux coating, I may also add suitable alloying ingredients which, when the coating burns or fuses in the arc, will combine with the welding metal to form the desired alloy. For this purpose I propose to employ alloys of manganese, titanium, and others, which may be found suitable for the particular character of the work being welded. The addition of clay and more specifically kaolin in the flux coating on the weld rod is particularly desirous due to the fact that the clay will, when the combustible ingredients will burn in the arc area, be deposited on the molten metal and also assist in effectively blanketing such pool of molten metal from the action of the oxygen and nitrogen in the surrounding atmsphere.

While the use of lignin in the foregoing description has been referred to as an employment of such lignin in its extracted state, it will be understood that this material may be employed as found in its natural state combined with other materials such as cellulose. Redwood bark has been found to be an exceptionally fruitful source of lignin supply, and consequently I may prefer to simply pulverize or grind such bark and employ the same in the coating without separating the lignin therefrom. It will be understood from the foregoing description that I may use other ingredients in the flux coating along with the lignin and sources of lignin supply other than the above referred to may be drawn upon so long as a substantial proportion of such raw material consists of lignin so that the full advantages of the use of this material in the weld rod coating may be appreciated.

As herein before stated, all of the elements which have previously been employed for the purpose of providing the proper combustible flux coating on the weld rod or electrode have been organic materials in which the ratio of hydrogen to oxygen is that to form water, namely two to one. The class of materials to which lignin belongs and with which it is associated is a departure from this previously employed group and consequently a more efficient and more highly effective flux coating results from the use of the class of materials to which lignin belongs.

Other forms may be employed embodying the features of my invention instead of the one here explained, change being made in regards to the composition and means herein disclosed, provided the ingredients or means stated by any of the following claims or the equivalent of such stated ingredients or means be employed.

I therefore particularly point out and distinctly claim as my invention:

1. An electrode for arc welding having a coating containing a combustible material consisting principally of lignin.
2. An electrode for arc welding having a coating including a combustible material consisting principally of lignin and a binder.
3. An electrode for arc welding having a coating including as principal constituents, lignin and a heat-resisting material.
4. An electrode for arc welding having a coating including as principal constituents, lignin and kaolin.
5. An electrode for arc welding having a coating including as principal constituents, lignin and a work alloying material.
6. An electrode for arc welding having a coating including as principal constituents, lignin, a binder, a heat-resisting material, and a work alloying material.

Signed by me, this 18th day of December, 1930.

THEOPHIL E. JERABEK.